F. D. OGDEN, DEC'D.
J. E. OGDEN, ADMINISTRATOR.
EYELET AND THE LIKE.
APPLICATION FILED JULY 14, 1910.
985,762.
Patented Feb. 28, 1911.
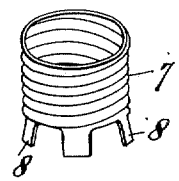
Fig. 1,
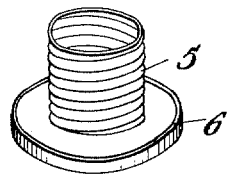
Fig. 2,
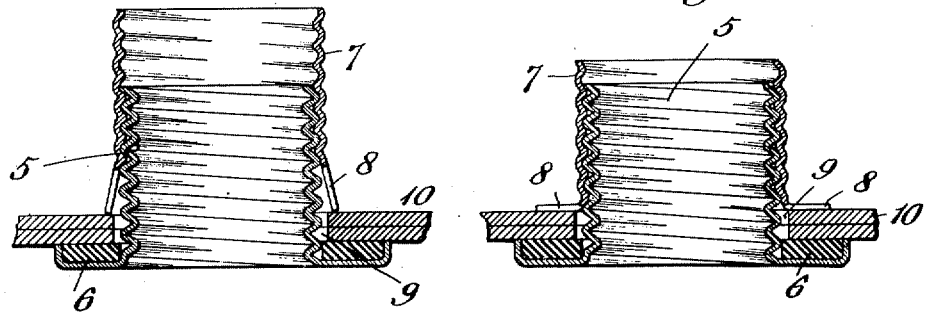
Fig. 3,
Fig. 4,
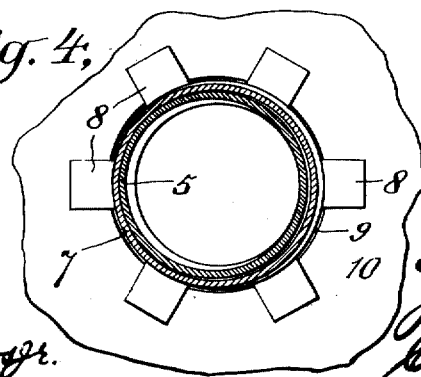
WITNESSES:
J. C. Hartmann
Lyman Andrews Jr.
INVENTOR
Fredric D. Ogden
J. Edward Ogden, Administrator
BY
Chapin & Rayford
his ATTORNEYS

UNITED STATES PATENT OFFICE.

FREDRIC D. OGDEN, DECEASED, LATE OF BAYONNE, NEW JERSEY; JOHN EDWARD OGDEN, ADMINISTRATOR.

EYELET AND THE LIKE.

985,762.

Specification of Letters Patent. Patented Feb. 28, 1911.

Application filed July 14, 1910. Serial No. 571,905.

*To all whom it may concern:*

Be it known that FREDRIC D. OGDEN, deceased, formerly a citizen of the United States of America and a resident of the city of Bayonne, county of Hudson, and State of New Jersey, did, prior to his decease, invent certain new and useful Improvements in Eyelets and the Like, of which the following is a specification, reference being had to the accompanying drawings, forming a part thereof.

The invention relates to eyelets and similar devices, and the main object thereof is to provide a simple, inexpensive eyelet which may be attached to structures such as sheet metal ceilings, trim, or the like, to which access can be had at one face only.

To the foregoing end the invention consists in a threaded stud and a nut fitted thereto, the nut being provided with oblique yielding projections such as may be compressed in order to permit of the nut being forced through an opening in the structure to which it is to be secured, the said projections springing outward when relieved of such compressive force, to engage the rear face of the structure, and adapted to be spread outward still further as the stud portion is screwed home into the nut. The stud portion itself is preferably internally screw threaded so that it may receive a bolt.

In order that the invention may be fully understood, I will now proceed to describe an embodiment thereof, having reference to the accompanying drawings illustrating the same, and will then point out the novel features in claims.

In the drawings: Figure 1 is a view in perspective of the stud and nut portions showing them separated. Fig. 2 is a view of the stud and nut portions after they have been applied to the structure with which they are to be used, but prior to the time the stud has been screwed home. Fig. 3 is a similar sectional view after the stud has been screwed home and the projections of the nut expanded thereby. Fig. 4 is a transverse sectional view through the parts in the condition in which they are shown in Fig. 3.

The stud portion of the device comprises an exteriorly threaded cylindrical member 5, provided with a flanged head 6, while the nut portion comprises an interiorly threaded substantially cylindrical body portion 7 provided with obliquely disposed expansible tongues 8. These tongues 8 project downward and outward as shown in the drawings, the inclination being at about, say, an angle of 10° with respect to the axis of the nut, so that their outer edges project slightly beyond the circumferential edge of the body portion 7. When the device is to be applied in use the stud is screwed partly into the nut and the nut is then forced inward through an opening 9 in a structural element 10 or other part to which the device is to be secured, the diameter of the said opening being arranged to be of such size as to permit the body portion of the nut just to pass freely therethrough. As the nut is forced inward the tongues 8 will be compressed by their engagement with the walls of the opening 9 until as they reach the opposite side of the element 10 they will spring outward as is shown in Fig. 2, resuming their normal position by reason of their own resilience. Thereafter, by screwing the stud home the nut will be drawn down and the tongues 8 will be spread or expanded to positions at right angles with the body portion as is shown in Fig. 3. The device is now secured firmly in position and has been so secured as will be readily understood, by manipulation from one side only of the structure to which it has been applied.

The stud 6 is preferably made hollow and internally screw threaded, as is shown, for the reason that after the device has been so applied the stud itself may be used as a nut for receiving a bolt or other device by which objects may be secured to the element 10,—or screw threaded stems of any character may be inserted therein and thus suspended therefrom; and it will, of course, be understood that the stud and nut themselves may constitute clamping means for securing two parts together.

Such a device is well adapted for use in conjunction with sheet metal ceilings, window frames, sashes, doors, and in fact in all types of sheet metal work, and as well may be used in conjunction with tile or similar structures to provide means for attaching various appliances thereto.

What is claimed is:

1. The combination with an exteriorly threaded stud provided with a flanged head, of a nut therefor comprising an interiorly threaded body portion and downwardly projecting yielding tongues the extremities of which extend outward beyond the body portion of the nut.

2. The combination with an exteriorly threaded stud provided with a flanged head, of a nut therefor comprising an interiorly threaded body portion provided with tongues which extend obliquely downward and outward therefrom, the extremities of the said stud extending to points wherein a circle bounding them will be greater than the diameter of an opening large enough to receive the body of the nut whereby as the nut is forced through the said opening the tongue will be compressed by the walls of the said opening, the said tongues being formed of yielding resilient material so that they will expand by their own resilience when they have been forced completely through the said opening, the said tongues being adapted to be still further expanded by engagement with the rear face of the structure having the said opening therein, as the stud is screwed home into the nut and the nut is thereby drawn toward the head of the stud, substantially as set forth.

3. An eyelet comprising a stud and a nut, the stud having a hollow interiorly and exteriorly screw threaded portion and a flanged head, and the nut having a substantially cylindrical interiorly screw threaded portion fitted to the said stud and oblique downwardly and outwardly extending yielding resilient tongues forming extensions from one end thereof.

JOHN EDWARD OGDEN,
*Administrator of the estate of Fredric D. Ogden, deceased.*

Witnesses:
I. B. MOORE,
E. S. MORRIS.